United States Patent
Smith et al.

(10) Patent No.: US 8,943,476 B2
(45) Date of Patent: Jan. 27, 2015

(54) SYSTEM AND METHOD TO IN-LINE SCRIPT DEPENDENCIES

(75) Inventors: Corbin Smith, Brooklyn, NY (US); Shyam Seshadri, Mumbai, IN (US)

(73) Assignee: Google Inc., Mountain View, CA (US)

( * ) Notice: Subject to any disclaimer, the term of this patent is extended or adjusted under 35 U.S.C. 154(b) by 369 days.

(21) Appl. No.: 13/160,021

(22) Filed: Jun. 14, 2011

(65) Prior Publication Data

US 2012/0324426 A1 Dec. 20, 2012

(51) Int. Cl.
G06F 9/44 (2006.01)
G06F 9/45 (2006.01)
G06F 11/36 (2006.01)

(52) U.S. Cl.
CPC .......... *G06F 11/3672* (2013.01); *G06F 8/4443* (2013.01)
USPC ............ 717/124; 717/106; 717/127; 717/140

(58) Field of Classification Search
CPC ........... G06F 8/30; G06F 8/41; G06F 8/4443; G06F 11/3688; G06F 11/3672; G06F 11/3466
See application file for complete search history.

(56) References Cited

U.S. PATENT DOCUMENTS

| | | | | |
|---|---|---|---|---|
| 7,827,523 B2 * | 11/2010 | Ahmed et al. | ................ | 717/106 |
| 8,392,890 B2 * | 3/2013 | Miller | ......................... | 717/127 |
| 8,732,665 B2 * | 5/2014 | Vedula et al. | ................. | 717/124 |
| 2006/0282428 A1 * | 12/2006 | McPherson et al. | .............. | 707/6 |
| 2007/0174824 A1 * | 7/2007 | Relyea et al. | ................. | 717/140 |
| 2008/0083012 A1 * | 4/2008 | Yu et al. | ............................ | 726/1 |
| 2008/0313611 A1 * | 12/2008 | Linville et al. | ................ | 717/115 |
| 2009/0037895 A1 * | 2/2009 | Le Roy | ......................... | 717/165 |
| 2009/0100154 A1 * | 4/2009 | Stevenson et al. | ............ | 709/220 |
| 2010/0064281 A1 * | 3/2010 | Kimball et al. | ............... | 717/124 |
| 2010/0125762 A1 * | 5/2010 | Nie et al. | ........................ | 714/49 |
| 2011/0067018 A1 | 3/2011 | Kawachiya et al. | | |
| 2011/0173597 A1 * | 7/2011 | Cascaval et al. | ............. | 717/148 |
| 2011/0296375 A1 * | 12/2011 | Mooney | ........................ | 717/106 |
| 2013/0007710 A1 * | 1/2013 | Vedula et al. | ................. | 717/124 |

OTHER PUBLICATIONS

Tuli Nivas, Test harness and script design principles for automated testing of non-GUI or web based applications, Jul. 2011, 8 pages.*

(Continued)

*Primary Examiner* — Thuy Dao
(74) *Attorney, Agent, or Firm* — Honigman Miller Schwartz and Cohn LLP (57) ABSTRACT

Systems, methods and articles of manufacture to in-line script dependencies are discussed herein. An embodiment includes extracting test resources addressed in language defining a test web page, placing markers identifying the location of each extracted test resource within the language defining the test page, iteratively loading external resources associated with a path of each test resource, analyzing each test resource to identify one or more dynamically added dependencies, and replacing each marker with external resources and dependencies that reference their respective marker to generate updated language defining an updated test web page. The embodiment further includes adding each identified dependency after or before a top level parent resource, performing the analyzing and the adding until no new dependencies are identified and providing each new dependency with a reference to a parent marker associated with the top level parent resource.

9 Claims, 4 Drawing Sheets

(56) References Cited

OTHER PUBLICATIONS

Sabbouh et al., Web mashup scripting language, May 2007, 2 pages.*
International Search Report for application No. PCT/US2012/042127 dated Aug. 20, 2012.

"Using ClosureBuilder" Feb. 24, 2012 XP002681948, retrived from the internet: url:https://developers.google.com/closure/library/docs/closurebuilder.

* cited by examiner

SYSTEM AND METHOD TO IN-LINE SCRIPT DEPENDENCIES

BACKGROUND

1. Field

Embodiments generally relate to testing frameworks, and particularly towards script testing.

2. Background

Unit testing is a method by which individual units of source code (or script) are tested to determine if they are fit for use. In one example, a unit may be a smallest testable part of an application. In another example, a unit may be an individual function or procedure. Unit tests are typically written and run by software developers to ensure that code behaves as intended when executed. Unit tests are generally run using testing frameworks. Testing frameworks may be used test a web page that includes script. Such testing of the web page may enable developers to determine if, for example, script in the web page loads and executes appropriately.

JsUnit is an example of a publicly available client-side (or browser-side) unit testing framework for JavaScript. A unit test using the JsUnit framework determines and retrieves the necessary files (or "dependencies") containing JavaScript code for a test to execute properly. In a first technique to load code dependencies into a browser for test, the JsUnit testing framework can place a script tag (e.g., "<script>") in the Hyper Text Markup Language (HTML) portion of a test page to reference the dependencies. In a second technique, the JsUnit testing framework can dynamically add a script tag referencing dependencies using loaded test code. In a third technique, the JsUnit testing framework can dynamically read dependencies from a server (e.g., using an iFrame or XML HttpRequest).

Each of these techniques require server, network and browser resources, resulting in a distinctly longer time for test setup. When the number of tests become non-trivial, test setup time increases due to the expenditure of resources, in browser and server, necessary to load test dependencies. Additionally, because of reduced computational and network resources, actual test execution time can increase resulting in inappropriate test failures. The second and third techniques noted above also expend browser resources which can result in slower test execution and occasionally even complete browser failure.

Some testing frameworks may cache dependencies at a server, or rely on a browser's built-in cache to store the dependencies. Server caching only reduces the time and resources necessary to serve the dependencies to the browser, still requiring a network connection and browser resources. Furthermore, because a browser's cache is inconsistent, caching of dependencies in the browser's built-in cache does not ensure that a script test will run appropriately and without error.

BRIEF SUMMARY

Embodiments relate to in-lining script dependencies. An embodiment includes extracting test resources addressed in language defining a test web page, placing markers identifying the location of each extracted test resource within the language defining the test page, iteratively loading external resources associated with a path of each test resource, analyzing each test resource to identify one or more dynamically added dependencies, and replacing each marker with external resources and dependencies that reference their respective marker to generate updated language defining an updated test web page. The embodiment further includes adding each identified dependency after or before a top level parent resource, performing the analyzing and the adding until no new dependencies are identified and providing each new dependency with a reference to a parent marker associated with the top level parent resource.

In this way, embodiments enable in-lining of script dependencies to reduce load and execution time of a script test.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements.

The drawing in which an element first appears is generally indicated by the left-most digit in the corresponding reference number.

DETAILED DESCRIPTION

Embodiments relate to in-lining script dependencies. Embodiments can in-line (or include) test resources and their dependencies within HTML defining a test page. Because test resources (e.g., scripts) and their dependencies (e.g., external files) are retrieved prior to testing the test page and directly included within HTML defining the test page, embodiments need not expend server and browser resources to load test resources and their dependencies into memory at test run time. In this way, embodiments reduce load and execute time of a script test.

Embodiments extract test resources addressed in language defining a test page and place markers identifying the location of each extracted test resource within HTML defining the test page. The markers enable embodiments to track locations of extracted test resources while dependencies associated with the test resources are being retrieved. Furthermore, the markers also enable the embodiments to maintain a correct hierarchy of retrieved parent and child dependencies so that the retrieved parent and child dependencies are appropriately included in the correct hierarchy within HTML defining the test page.

Embodiments load external resources associated with a path of each test resource and analyze each test resource to identify dynamically added dependencies while replacing each marker with external resources and dependencies that reference their respective marker to generate updated language defining an updated (or in-lined) test page. A script test can then be run using the in-lined test page.

Embodiments further include adding each identified dependency after or before a top level parent resource and performing the analyzing of each test resource and the adding until no new dependencies are identified. Embodiments provide each new dependency with a reference to a parent marker associated with the top level parent resource.

While the following is discussed herein with reference to illustrative embodiments for particular applications, it should be understood that the embodiments are not limited thereto. Those skilled in the art with access to the teachings provided herein will recognize additional modifications and applications within the scope thereof and additional fields in which the embodiments would be of significant utility.

System

Figure 1:
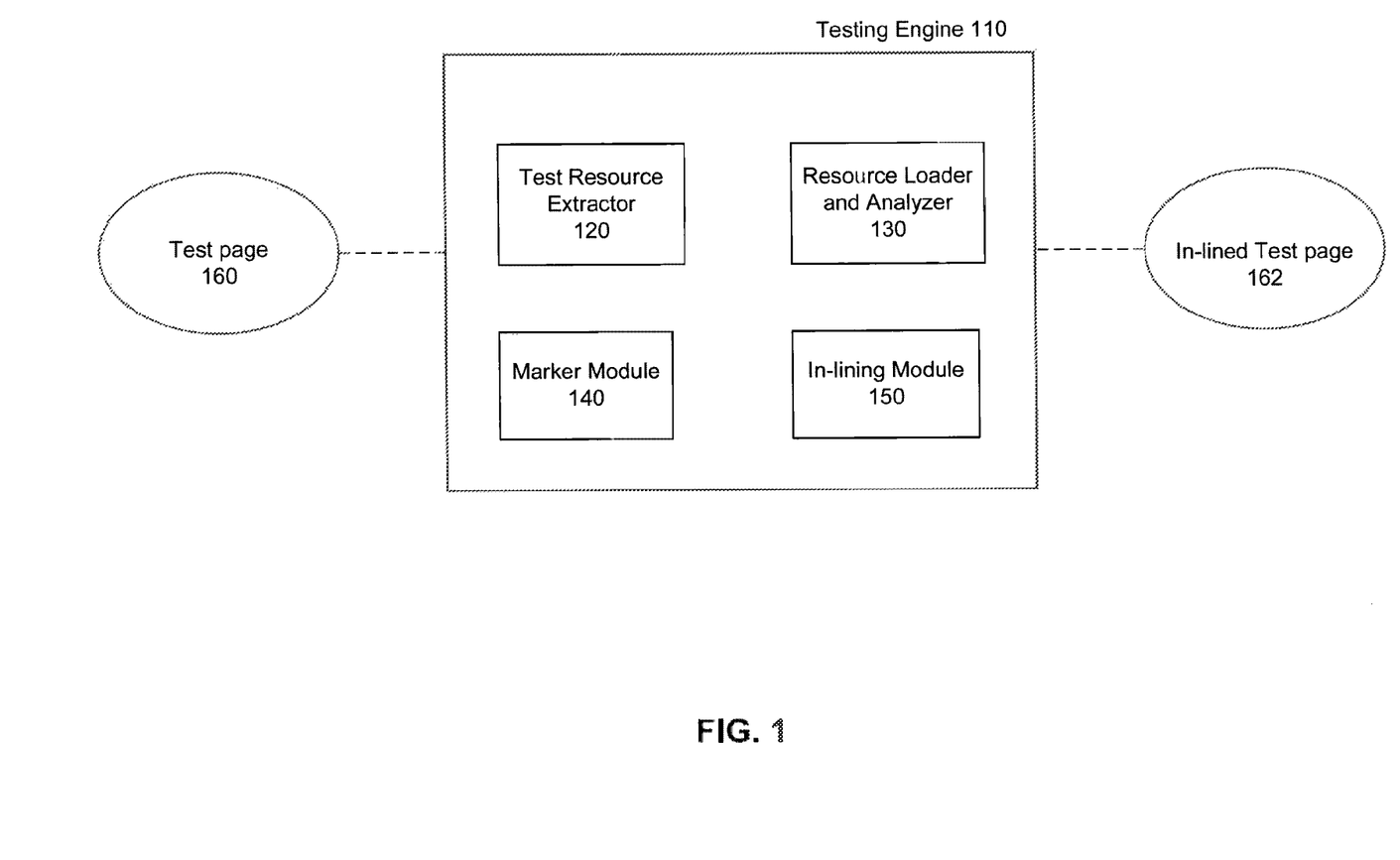
FIG. 1 illustrates a system for in-lining script dependencies within test code, according to an embodiment.

This section describes a system for in-lining script dependencies according to an embodiment illustrated in FIG. 1. FIG. 1 is a diagram of a system 100 for in-lining script dependencies. While the following is described in terms of JavaScript and HTML, the embodiments are not limited to JavaScript and HTML, and can be applied to any other forms of executable content, code, or content defining (or mark-up) language. The embodiments are applicable to any system having generally the structure of FIG. 1, or that would benefit from the operation, methods and functions as described herein.

FIG. 1 is an architecture diagram of testing engine 110, according to an embodiment. As shown in FIG. 1, testing engine 110 includes test resource extractor 120, resource loader and analyzer 130, marker module 140 and in-lining module 150. FIG. 1 also illustrates test page 160 and in-lined test page 162. In an embodiment, test resource extractor 120 is configured to extract test resources addressed in language (e.g., HTML) defining test page 160. Marker module 140 is configured to place markers for identifying the location of each test resource within the language defining test page 160. Resource loader and analyzer 130 is configured to iteratively load into memory external resources associated with a path of each test resource, and analyze each test resource to identify dynamically added dependencies. In an embodiment, an in-lining operation may include replacing a function call site with the body (or code) of the called function. In-lining module 150 replaces each marker with resources and dependencies that reference their respective marker to generate updated language defining in-lined test page 162. In an embodiment, testing engine 110 then performs a script test using in-lined test page 162. Because test resources (e.g., scripts) and their dependencies (e.g., external files) are retrieved prior to testing the test page and directly included within HTML defining in-lined test page 162, embodiments need not expend server and browser resources to load test resources and their dependencies into memory at test run time. In this way, embodiments reduce load and execute time of a script test.

The operation of test resource extractor 120, resource loader and analyzer 130, marker module 140 and in-lining module 150 is discussed further below.

Testing engine 110 can be any type of processing (or computing) device having one or more processors. For example, testing engine 110 can be a workstation, mobile device, computer, cluster of computers, set-top box, or other device having at least one processor. Such a device may include, but is not limited to, a device having a processor and memory for executing and storing instructions. Such a device may include software, firmware, and hardware. Software may include one or more applications and an operating system. Hardware can include, but is not limited to, a processor, memory and user interface display. Optional input devices, such as a mouse, touch sensitive screen, or any future developed interaction method may be used.

Testing engine 110 may also be implemented within a browser. Such a browser can be implemented on any type of processing (or computing) device having one or more processors. In an embodiment, testing engine 110 may also be implemented as a Java "servlet" that is instantiated on a server (not shown) that communicates over a network with testing engine 110. Testing engine 110 may also be implemented as a standalone application or module.

In an embodiment, testing engine 110 is configured to read test page 160 and generate in-lined test page 162 where script dependencies have been in-lined by testing engine 110. In an embodiment, test page 160 may be a HTML file or any other file. In an embodiment, test page 160 includes one or more test resources. Test resources may be test functions that include script code (e.g., JavaScript) that can be executed when test page 160 is read by testing engine 110. In an embodiment, test resources within test page 160 may be identified by testing engine 110 using tags (or identifiers) appearing adjacent to (or encapsulating) the test resources. In an example where the test resources are JavaScript, such tags, may be script tags (e.g., "<script>"). As known to persons skilled in the art, a script tag is used to define and identify a client-side script, such as JavaScript. The script tag may include scripting statements or it may point to an external script file through an "src" attribute. It is to be appreciated that the embodiments are not limited to script tags and JavaScript, and may be used with other forms of test resource identifiers or scripts known now or developed in the future.

In an embodiment, test resource extractor 120 is configured to extract test resources included or addressed in language (e.g., HTML) defining test page 160. Test resources may be test functions that include script code (e.g., JavaScript) that can be executed when test page 160 is read by testing engine 110 for a test. In an embodiment, test resources within test page 160 may be identified by tags (or identifiers) appearing adjacent to (or encapsulating) the test resources. As noted above, such script tags may be embedded within HTML defining test page 160. In an embodiment, test resource extractor 120 parses test page 160 to identify and extract script tags and associated scripts.

In an embodiment, marker module 140 is configured to place markers identifying the location of each extracted test resource within HTML defining test page 160. A marker can be any form of identifier or data structure that is used by marker module 140 to identify and maintain the location of each extracted test resource.

In an embodiment, resource loader and analyzer 130 is configured to load into memory external resources (e.g., files, images, scripts, etc.) associated with a path of each test resource addressed in test page 160. In an embodiment, resource loader and analyzer 130 may iterate over the path of each test resource to load external dependencies that may be referenced by the path of the test resource. In an example scenario, a test resource may need external resources (e.g., files, images, scripts, etc.) for the test resource to execute properly. Such external resources may be located at a server independent from testing engine 110 or may even be located on a computing device on which testing engine 110 is operating. By iteratively loading external resources (or other dependencies) needed by a test resource into memory in advance, lesser time is required to execute a test because such loading of external resources need not occur in real-time when the test is run.

In an embodiment, when resource loader and analyzer 130 determines that a test resource path is not resolvable (or accessible), resource loader and analyzer 130 and marker module 140 maintain the placement of the test resource, along with the un-resolvable path, to enable testing engine 110 to load resources associated with the test resource path at runtime.

In an embodiment, resource loader and analyzer 130 analyzes each loaded test resource to identify dynamically added dependencies. Dynamically added dependencies may be scripts or any other files that may be needed by a test resource at runtime. In an embodiment, resource loader and analyzer 130 may identify dynamically added dependencies by evaluating scripts using a script runtime engine (e.g. JavaScript runtime engine) and parsing the test resource to identify dependency hints. Such dependency hints may include, for example, resource requirement calls.

In an embodiment, resource loader and analyzer 130 adds each new identified dependency either after the top level parent resource (i.e., mimicking a browser's runtime HTML load order), or before the top level parent resource (i.e., mimicking the dynamic resolution load order). Marker module 140 also provides each new dependency with a reference to a parent marker that is associated with the top level parent resource.

In an embodiment, resource loader and analyzer 130 continues to identify and add each new dependency to a top level parent resource, until no new resources are identified. In this way, by iteratively loading external resources (or other dependencies) needed by a test resource in advance of testing, lesser time is required to execute the test because such loading of external resources need not occur in real-time when the test is run.

As noted above, marker module 140 is configured to place markers identifying the location of each extracted test resource within HTML defining test page 160. A marker can be any form of identifier or data structure that is used by marker module 140 to identify and maintain the location of each extracted test resource. In an embodiment, in-lining module 150 replaces each marker with extracted resources and dependencies that reference their respective marker to generate in-lined test page 162.

In an embodiment, any unresolved markers (or markers associated with unresolved paths) are left unchanged so that testing engine 110 may load resources associated with those unresolved paths at runtime. Testing engine 110 then performs a script test using in-lined test page 162. Because test resources (e.g., scripts) and their dependencies (e.g., external files) are retrieved prior to testing the test page and directly included within HTML defining in-lined test page 162, embodiments need not expend server and browser resources to load test resources and their dependencies into memory at test run time. In this way, embodiments reduce load and execute time of a script test.

Figure 2A:
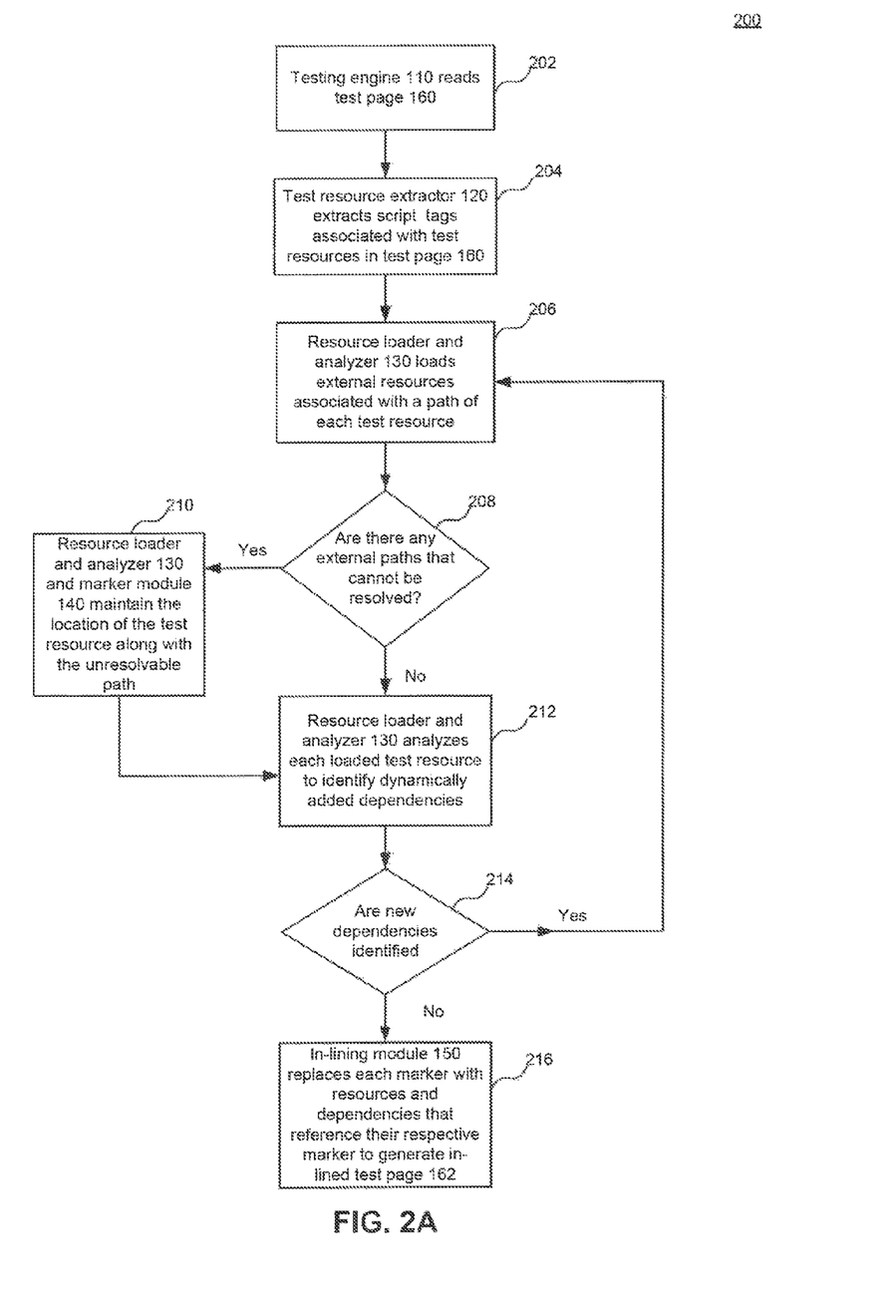
FIG. 2A illustrates an exemplary overall operation of a testing engine, according to an embodiment.

FIG. 2A is a flowchart illustrating method 200. Method 200 is an exemplary overall operation of testing engine 110, according to an embodiment.

Method 200 begins with testing engine 110 reading test page 160 (step 202). As an example, such a test page may be a HTML file or any other file. In an embodiment, a test page includes one or more test resources. Test resources may include script code (e.g., JavaScript).

Test resource extractor 120 extract script tags associated with test resources in test page 160 (step 204). As discussed above, such script tags may be embedded within HTML defining test page 160. In an embodiment, test resource extractor 120 parses test page 160 to identify and extract script tags and associated scripts.

Resource loader and analyzer 130 loads external resources associated with a path of each test resource (step 206). In an example scenario, a test resource may need external resources (e.g., files) for the test resource to execute properly. Such external resources may be located at a server independent from testing engine 110 or may even be located on a computing device on which testing engine 110 is operating. Such external resources may be loaded iteratively by resource loader and analyzer 130.

Resource loader and analyzer 130 also checks if there are any external test resource paths that cannot be resolved (step 208). When resource loader and analyzer 130 determines that a test resource path is not resolvable (step 208), resource loader and analyzer 130 and marker module 140 maintain the placement of the test resource, along with the un-resolvable path (step 210) and method 200 proceeds to step 212.

Returning to step 208, if resource loader and analyzer 130 determines that all external test resource paths have been resolved (step 208), resource loader and analyzer 130 analyzes each loaded test resource to identify dynamically added dependencies (step 212). As an example, dynamically added dependencies may be scripts or any other files that may be needed by a test resource at runtime.

Resource loader and analyzer 130 checks if new dependencies are identified in step 212 (step 214). If resource loader and analyzer 130 identifies new dependencies (step 214), method 200 proceeds to step 206, where resource loader and analyzer 130 loads external resources associated with a path of each test resource. If resource loader and analyzer 130 identifies no new dependencies (step 214), in-lining module 150 replaces each marker with resources and dependencies that reference their respective marker to generate in-lined test page 162 (step 216).

Figure 2B:
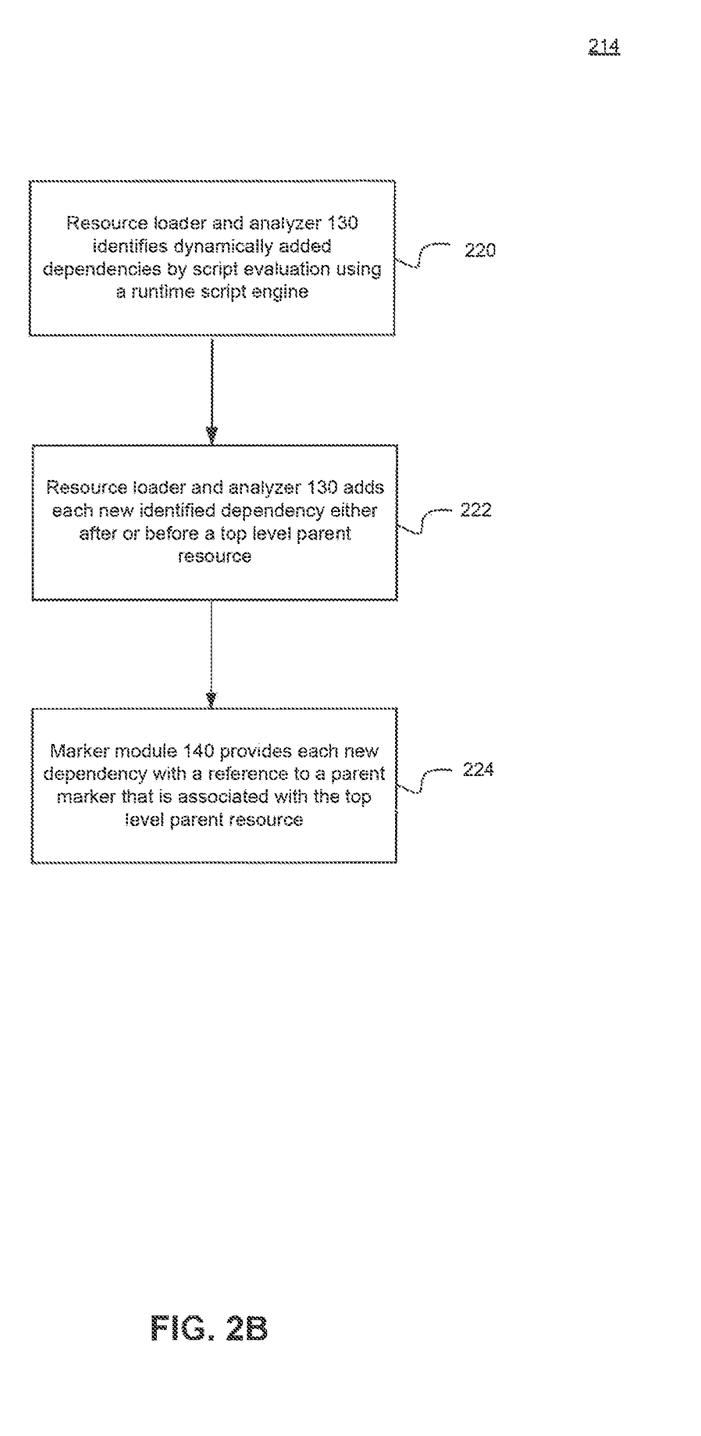
FIG. 2B illustrates an exemplary operation performed by a testing engine, according to an embodiment.

FIG. 2B is a flowchart illustrating step 214 of method 200 in greater detail, according to an embodiment. In an embodiment, resource loader and analyzer 130 identifies dynamically added dependencies by evaluating scripts using a script runtime engine (e.g. JavaScript runtime) and parsing the test resource (e.g., script) to identify dependency 'hints' (step 220). Such hints may include, for example, resource requirement calls.

Resource loader and analyzer 130 adds each new identified dependency either after the top level parent resource (i.e., mimicking a browser's runtime HTML load order), or before the parent resource (i.e., mimicking the dynamic resolution load order) (step 222). Marker module 140 also provides each new dependency with a reference to a parent marker that is associated with the top level parent resource (step 224).

In this way, by iteratively loading external resources (or other dependencies) needed by a test resource in advance of testing the test page, lesser time is required to execute the test because such loading of external resources need not occur in real-time when the test is run.

Example Computer Embodiment

Figure 3:
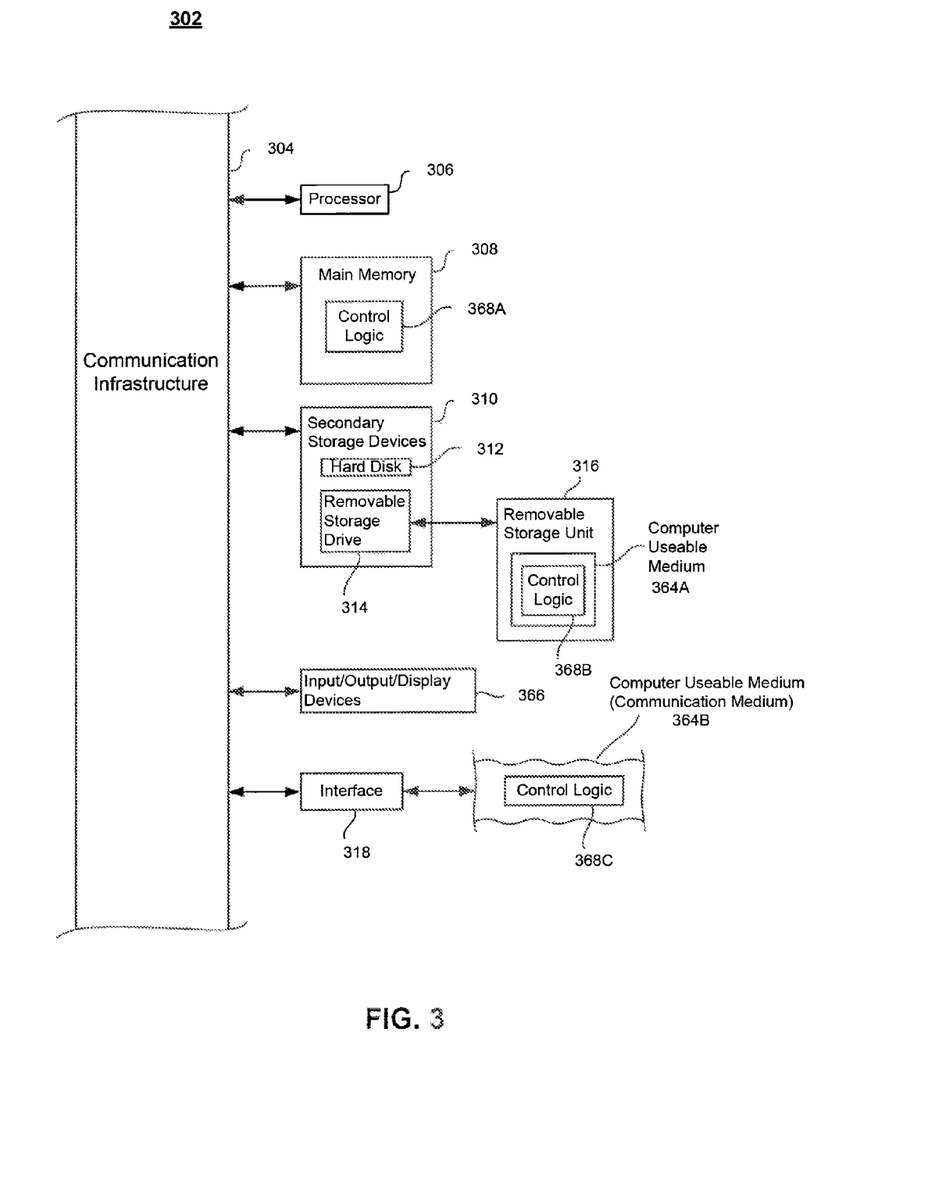
FIG. 3 illustrates an example computer useful for implementing components of the embodiments.

In an embodiment, the system and components of the embodiments described herein are implemented using one or more computers, such as example computer 302 shown in FIG. 3. For example, testing engine 110 can be implemented using computer(s) 302.

Computer 302 can be any commercially available and well known computer capable of performing the functions described herein.

Computer 302 includes one or more processors (also called central processing units, or CPUs), such as a processor 306. Processor 306 is connected to a communication infrastructure 304.

Computer 302 also includes a main or primary memory 308, such as random access memory (RAM). Primary memory 308 has stored therein control logic 368A (computer software), and data.

Computer 302 also includes one or more secondary storage devices 310. Secondary storage devices 310 include, for example, a hard disk drive 312 and/or a removable storage device or drive 314, as well as other types of storage devices, such as memory cards and memory sticks. Removable storage drive 314 represents a floppy disk drive, a magnetic tape drive, a compact disk drive, an optical storage device, tape backup, etc.

Removable storage drive 314 interacts with a removable storage unit 316. Removable storage unit 316 includes a computer useable or readable storage medium 364A having stored therein computer software 368B (control logic) and/or data. Removable storage unit 316 represents a floppy disk, magnetic tape, compact disk, DVD, optical storage disk, or any other computer data storage device. Removable storage drive 314 reads from and/or writes to removable storage unit 316 in a well known manner.

Computer 302 also includes input/output/display devices 366, such as monitors, keyboards, pointing devices, Bluetooth devices, etc.

Computer 302 further includes a communication or network interface 318. Network interface 318 enables computer 302 to communicate with remote devices. For example, network interface 318 allows computer 302 to communicate over communication networks or mediums 364B (representing a form of a computer useable or readable medium), such as LANs, WANs, the Internet, etc. Network interface 318 may interface with remote sites or networks via wired or wireless connections.

Control logic 368C may be transmitted to and from computer 302 via communication medium 364B.

Any tangible apparatus or article of manufacture comprising a computer useable or readable medium having control logic (software) stored therein is referred to herein as a computer program product or program storage device. This includes, but is not limited to, computer 302, main memory 308, secondary storage devices 310 and removable storage unit 316. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all exemplary embodiments as contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal their general nature that others can, by applying knowledge within the skill of the art, readily modify and/or adapt for various applications such specific embodiments, without undue experimentation, without departing from their general concept. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A computer implemented method to in-line script dependencies, comprising:
   extracting test resources addressed in language defining a test web page;
   placing markers identifying a location of each extracted test resource within the language defining the test page;
   iteratively loading, into non-transitory memory, external resources associated with a path of each test resource;
   analyzing each test resource to identify one or more dynamically added dependencies based on any corresponding resource requirement calls in the test resource referencing the one or more dynamically added dependencies, each dynamically added dependency comprising a script or file;
   adding each identified dependency after or before a top level parent resource;
   performing the analyzing and the adding until no new dependencies are identified;
   providing each new dependency with a reference to a parent marker associated with the top level parent resource; and
   replacing each marker with external resources and dependencies that reference their respective marker to generate updated language defining an updated test page;
   wherein each step is performed using one or more processors.

2. The method of claim 1, wherein the iteratively loading comprises:
   maintaining the placement of each test resource and its path, when the path cannot be resolved to load external resources.

3. The method of claim 1, wherein the analyzing comprises:
   evaluating a script using a script runtime engine; and
   parsing the script to identify references to resource dependencies.

4. A computer based system to in-line script dependencies, comprising:
   one or more processors;
   a test resource extractor configured to extract test resources addressed in language defining a test web page;
   a marker module configured to maintain markers identifying a location of each test resource within the language defining the test page;
   a resource loader and analyzer configured to:
      iteratively load external resources associated with a path of each test resource;
      analyze each test resource to identify one or more dynamically added dependencies based on any corresponding resource requirement calls in the test resource referencing the one or more dynamically added dependencies, each dynamically added dependency comprising a script or file;
      add each identified dependency after or before a top level parent resource; and provide each new dependency with a reference to a parent marker associated with the top level parent resource; and an in-lining module configured to replace each marker with resources and dependencies that reference their respective marker to generate updated language defining an updated test page, wherein the test resource extractor, the marker module, the resource loader and analyzer and the in-lining module are implemented on the one or more processors.

5. The system of claim 4, wherein the marker module is further configured to:

maintain the placement of each test resource and its path, when the path cannot be resolved to load external resources.

6. The system of claim 4, wherein the resource loader and analyzer is further configured to:

evaluate a script using a script runtime engine; and parse the script to identify references to resource dependencies.

7. An article of manufacture including a non-transitory computer-readable medium having instructions stored thereon that, when executed by a computing device, cause the computing device to perform operations comprising:

extracting test resources addressed in language defining a test web page;

placing markers identifying a location of each extracted test resource within the language defining the test page;

iteratively loading external resources associated with a path of each test resource;

analyzing each test resource to identify one or more dynamically added dependencies based on any corresponding resource requirement calls in the test resource referencing the one or more dynamically added dependencies, each dynamically added dependency comprising a script or file;

adding each identified dependency after or before a top level parent resource;

performing the analyzing and the adding until no new dependencies are identified;

providing each new dependency with a reference to a parent marker associated with the top level parent resource; and replacing each marker with external resources and dependencies that reference their respective marker to generate updated language defining an updated test page.

8. The article of manufacture of claim 7, wherein the iteratively loading further comprises instructions that cause the computing device to perform operations comprising:

maintaining the placement of each test resource and its path, when the path is cannot be resolved to load external resources.

9. The article of manufacture of claim 7, wherein the analyzing further comprises instructions that cause the computing device to perform operations comprising:

evaluating a script using a script runtime engine; and parsing the script to identify references to resource dependencies.

\* \* \* \* \*